Inventor:
Francis D. Wyatt.
By
Atty.

Inventor:
Francis D. Wyatt.

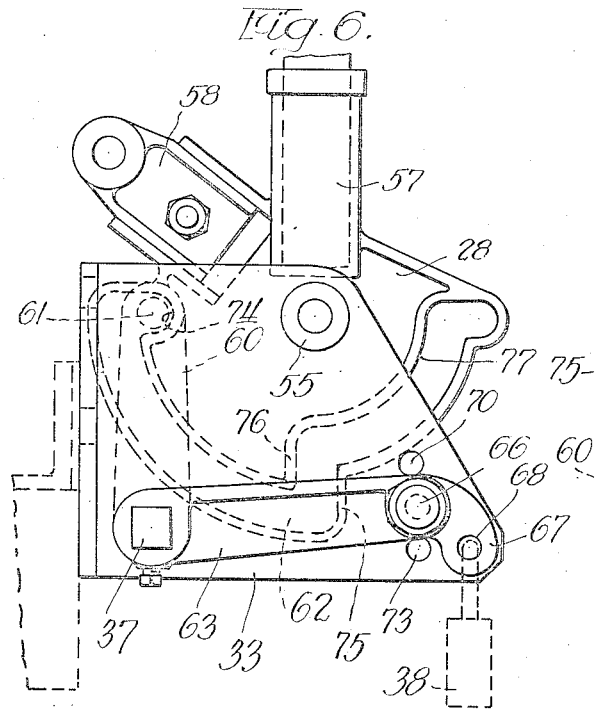
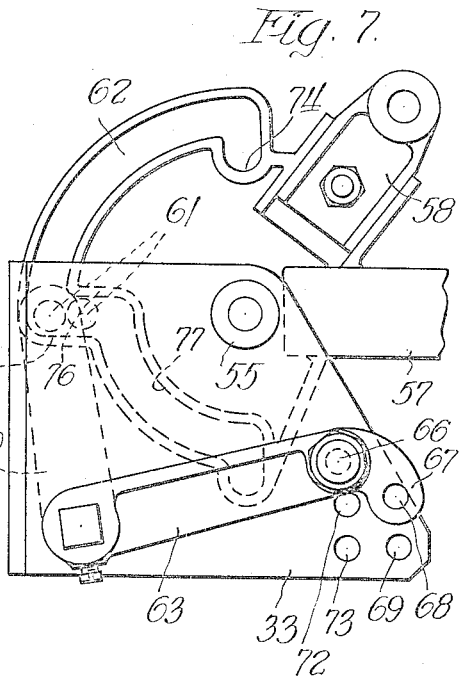
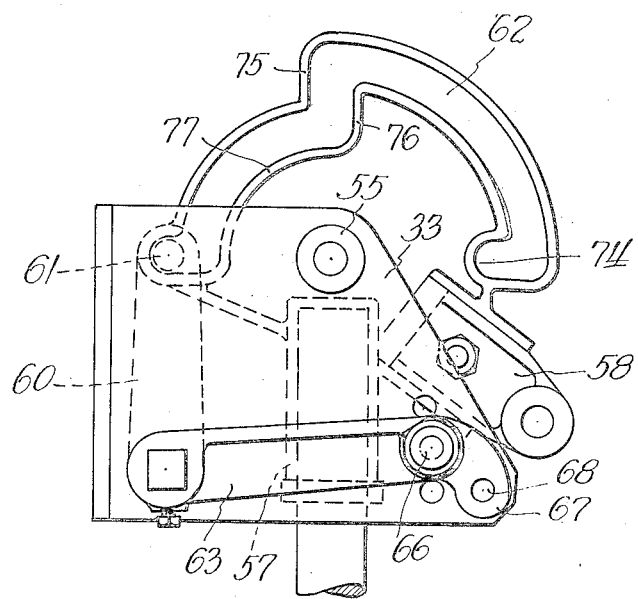

Patented Apr. 28, 1936

2,038,779

UNITED STATES PATENT OFFICE 2,038,779

SWITCH INTERLOCKING MEANS AND METHOD

Francis D. Wyatt, Davenport, Iowa

Application October 4, 1933, Serial No. 692,062

20 Claims. (Cl. 200—5)

My invention relates generally to switches, and is particularly concerned with a novel switch interlocking means and method.

A brief review of the antecedents of the invention is outlined below so that the various structural and functional features which I shall presently disclose in detail, will be better understood and appreciated. In this cursory review of the art, and also in the subsequent detailed description, I will refer only to such apparatus and extraneous equipment as should be considered for a complete understanding of my invention. Known matter will be treated briefly or, if not required for a clear understanding, it will be omitted entirely in order to keep the description simple and lucid.

The equipment for transmitting electrical energy in a polyphase system includes, among other apparatus, circuit breakers and various conductors. Some of the conductors serve the purpose of transmitting power and are termed "line" conductors or are briefly referred to as the "line" or "lines". Other conductors are more in the nature of protective equipment and are referred to as "ground" conductors. In addition to these classes of conductors there are several other conductors some of which may be termed "service" conductors. Switches are interposed between the various conductors and equipment in order to permit manipulations required by the service and its varying conditions. The conductors may be conveniently disposed on insulators carried on suitable racks or switch gear. Switching means may also be carried on this equipment to permit the necessary connecting and disconnecting operations.

For example, it might be desired to connect a phase and its corresponding circuit breaker to the line or to connect the same to ground in order to meet certain service conditions. This is accomplished by the above intimated switching means.

My invention is disclosed in the following descriptions in connection with such switching means.

I want to have it understood, however, that the disclosure is made in connection with specific switching apparatus and in a specific manner, merely for convenience of description and not for the purpose of indicating structural and/or functional limitations other than those which appear from the scope of the description and from the appended claims.

Assuming now the practical example of a three-phase system, and further assuming that the three phases are connected to the line by means of the previously mentioned switching means, it will be clear that indiscriminate or accidental switching must be avoided by precautions depending on the service conditions of the system. Such a precaution may reside in the provision of an electrically governed interlocking mechanism for the switches, depending on the operating condition of the oil circuit breaker or breakers. An interlocking coil may be provided in this case adapted, when energized, to actuate a latch or the like for releasing the interlocking mechanism, so that the switching means can be operated only when the circuit breaker opens. In other words, the opening of a circuit breaker prepares or completes and closes the circuit for the switch interlocking coil. The coil, when energized, attracts its armature, thereby releasing the lock for the operation of the switching means. If desired and necessary, all three phases can now be grounded by manipulating the corresponding switches.

An interlocking means such as outlined above, does not include reliable and simple provisions for single pole operation, i. e., it does not permit the disconnection of a phase from a line while at the same time positively preventing the grounding of any phase, as long as any other phase is connected to the line. However, it will likewise be clear that such an operation is very desirable and that it would render many advantages and safeguards for the service. Among these advantages is the possibility of operating a system, e. g., a three-phase-four-wire lighting circuit on one phase in a very simple and reliable manner.

My invention overcomes the drawbacks of previously known methods and means for operating switches of this class. I have provided interdependent interlocking means for individual control of the switches, and have retained the advantages resulting from an electrically governed common interlock depending on the service conditions of the circuit breaker or breakers. This electrical interlock, which I have also improved, prevents the operation of any of the switches unless the previously mentioned electrically governed control coil is energized, and a novel interdependent mechanical interlock is provided for the switches which permits single pole operation but prevents grounding of any phase if any other phase is connected to the line.

The switches of an operating unit are mounted on suitable supporting means and are disposed in a row adjacent to each other. Each switch comprises individually operable actuating means consisting of suitably formed blades, and an operating lever movably connected thereto. Each lever is pivotally joined to an actuating member provided with a handle. These actuating members are mounted so as to be individually rotatable within corresponding supporting brackets. A common interlock control shaft extends along the row of switches, carrying a locking and control extension for each of the actuating members, and adapted to engage an internal cam provided on each of the actuating members. It will thus be seen that the individual operation of any of these actuating members, and, accordingly, operation of any of the switches, is dependent on the common interlocking shaft.

This shaft is under the control of an electric coil which, in turn, is dependent on certain service equipment, e. g., on the circuit breaker. Assuming that the circuit breaker is closed, the coil will be deenergized. A latch governed by the coil will lock the interlocking control shaft against operation, and, since the locking extensions on the shaft are now in locking engagement with the corresponding internal cams of the actuating members for the switches, it will be clear that none of the switches can be operated. However, the coil is adapted to be energized, in a manner which I will presently describe, as soon as the circuit breaker opens. Upon energizing, it will release the latch and thereby release the interlocking shaft for operation.

Secured to the shaft is a self locking handle. The attendant will now be in a position to actuate the shaft to release its locking extensions within the internal cams of the actuating members provided for the switches, and to move any of the actuating members of any of the switches so as to operate the corresponding blades to disconnect position. Movement beyond the disconnect position, is, however, prevented due to the interdependence of the cooperation of the cams and the locking extensions on the interlock shaft. Single pole operation is thus made possible but the grounding of any phase is prevented so long as any other phase is connected to the line and vice versa.

After all of the actuating members have been moved into disconnect position, as above described, the locking extensions on the interlock shaft will assume such a position within the corresponding internal cams as to allow further motion of the actuating members, i. e., of the switches, into the grounding position.

It will be apparent from the above brief account of my invention that it comprises the following features:

*First.*—A common electrically governed interlocking means prevents the actuation of any of the switches in a unit while the circuit breaker is closed.

*Second.*—Each switch is provided with an individual actuating member initially governed by the common interlocking means.

*Third.*—The individual actuating members for the switches of a unit are each provided with cam means which cooperate with locking means on the common interlock in such a manner as to permit the selective operation of any of the actuating members thru predetermined cycles of operation.

Other objects and features will appear from the following detailed description of the drawings, in which, Figure 1 shows the front view of a unit including three switches and the control and interlock mechanism therefor;

Figures 6, 7, and 8 illustrate side views of the novel interlock in three different operating positions, showing the interdependence of the structures belonging to a set of switches.

Like reference numerals designate like parts throughout the drawings.

Figure 1:
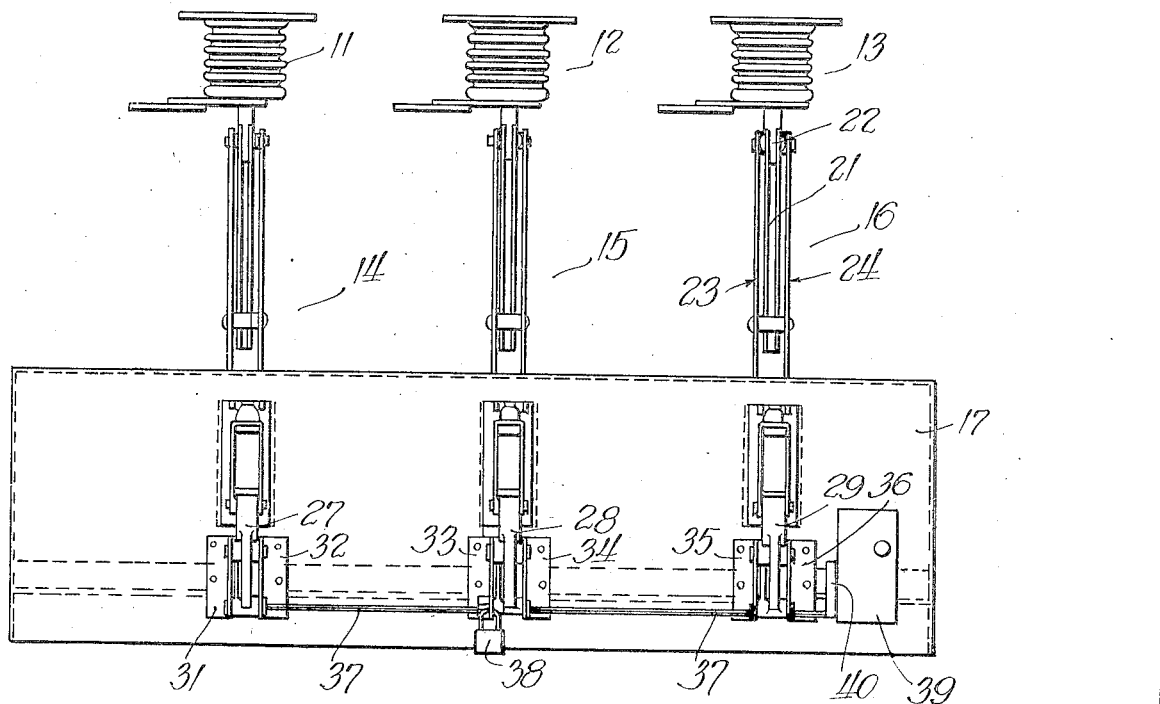
Figure 2:
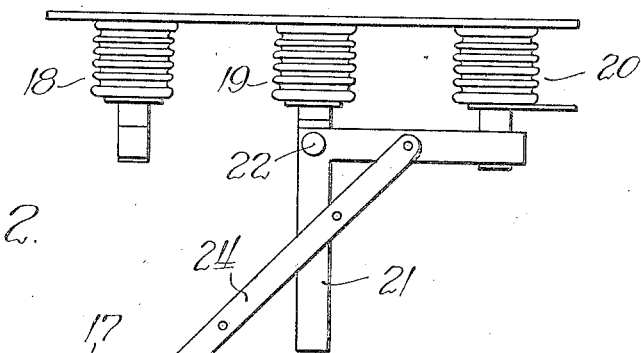
Figure 2 illustrates the side view of the equipment shown in Figure 1.

Referring now particularly to the drawings, Figs. 1 and 2, numerals 11, 12 and 13 indicate generally, three phases and the conductors and mountings therefor; numerals 14, 15 and 16 indicate generally the switching means for the corresponding phases; and numeral 17 designates generally the mounting for certain parts of the control and switching equipment. It will be seen from Figure 2 that each phase comprises a ground connection and its mounting, generally designated by numeral 18; a line connection and its mounting, generally indicated by numeral 19, and the connection to the circuit breaker which is generally marked by numeral 20. The corresponding phase is shown to be connected to the line. Angular switch blades, such as 21, are pivotally secured as is indicated at 22. Actuating links such as 23 and 24, (Figs. 1 and 2), are provided for operating the individual switch blades. The operating elements are duplicated in each set of switching means. The links of each set are connected, each by means of an adjustable joint such as 25, to the corresponding levers, such as indicated in Figure 2 by the numeral 26. These levers are in turn connected to certain actuating members, such as 27, 28 and 29, each provided with a cam as will be described later on. A handle such as 30 is secured to each actuating member. If one of these handles is moved in the direction of the arrow shown in Figure 2, by about 90° from the position shown, the corresponding switch will be operated to disconnect the respective phase from the line.

Such an actuation of the switch would be possible only in case the previously mentioned common interlock, which is governed by the circuit breaker is released due to opening of the same. It may also be remarked that any one of the switches can be actuated selectively into the disconnect position described above, independent of any other switch of the unit. Single pole operation of the system is thus made possible. However, it will be seen presently, that the novel inter-dependent interlock prevents the grounding of any phase, i. e., operation of any of the switches by 90° from the disconnect position or substantially 180° from the position shown in Figure 2, if any other phase is connected to the line. In other words, the grounding of any phase is only possible after all phases belonging to the unit have been disconnected.

Reference numerals 31—32, 33—34 and 35—36 designate brackets for mounting the various interlock mechanisms on the support 17. 37 indicates the previously mentioned interlock control shaft extending from left to right through the interlock mechanisms as shown in Figure 1. It functions initially as a common control shaft, and subsequently as an individual control means in a manner which I will describe later in detail, and may be locked in a predetermined normal position by means of a padlock 38 or the like, in order to prevent unauthorized tampering with the equipment. This interlock shaft terminates in the control assembly 39 which is particularly shown in Figure 3.

Included in this control assembly is the equipment for the electrical interlock which depends on the service condition of the circuit breaker or the like. Secured to the shaft 37, within the control assembly is a lever 42 which is engaged by the locking latch 43 operable by a coil or solenoid 45. The latter will be in de-energized condition as long as the circuit breaker is closed. The shaft 37 will be locked against any movement, and, in turn, will lock the switches against operation. However, if a circuit breaker opens, the coil 45 will be energized to release the interlocking shaft 37. The switches shown in the drawings can then be properly operated.

Spring means 40 or the like (Figure 1) for automatically restoring the shaft 37 to normal position are indicated at the left of the interlock control assembly 39. The shaft 37 may be square or may be circular and flattened on two opposite sides at the place where the spring means 40 is disposed. This spring means may comprise two leaf springs engaging the square shaft or the flattened sides thereof. When the shaft is turned, one or the other of the leaf springs will be tensioned, and will exercise a pressure on the shaft, tending to restore it to normal position. It is believed that the above description will suffice for conveying a clear understanding of this part of the equipment.

Referring again to Figure 3, it will be seen that the locking latch 43 is pivotally secured at 44. The coil or solenoid 45 is adapted to lift the locking latch 43 and to release thereby the interlocking shaft 37. Numeral 46 indicates a resistance element and 47 is a support therefor. The circuit for the coil 45 is normally open, that is to say, the coil will be de-energized as long as the circuit breaker is closed. The opening of a circuit breaker will effect the closure of a circuit including the coil 45 and the contacts 48—49. In other words, the circuit for the coil 45 will be prepared upon opening of an oil switch or circuit breaker. It may be remarked at this point that the circuit for the coil 45 may be prepared in any other suitable manner and in response to any desirable operating or service condition of the system. I am noting the circuit breaker but do not wish to be limited to this particular apparatus for actuating the coil 45. The energization of coil 45 will take place upon actuation of the push button 50. This contact operating member which may be in the form of a push button as shown, and the contacts 48—49 operated thereby and completing the circuit for the coil 45 prevent unnecessary energization of the coil 45 during the interval beginning with the opening of the circuit breaker (or the actuation of any other suitable equipment for this purpose) and the time when the attendant arrives to carry out the required switching operations. The release of the interlocking shaft 37 will be affected only upon actuation of the push button 50. If desired, the push button or switch member 50 may be of the self-locking type which remains in operative position when depressed and releases upon repeated actuation, or, the coil and/or the latch may be provided with means for retarding release after energization of the coil and consequent release movement of the latch.

It will be understood from the above description of the common control assembly 39, that the shaft 37 is locked against operation as long as the circuit breaker is closed, and that it is released responsive to actuation of the operating member 50 if a circuit breaker is open. The attendant can now manipulate the switches.

The various operations will be explained below particularly with reference to Figures 4 to 8, inclusive, which illustrate the interlocking mechanism of one of the switches belonging to the set shown in Figure 1. Since all of these switches and their operating mechanisms are substantially similar in structure and function, let us assume for the sake of description that the mechanism shown in Figures 4 to 8, inclusive is the one shown in the center of Figure 1, having the interlocking actuating member 28 and provided with a padlock 38. It will be understood, of course, that only one padlock is required for the unit and that it may be suitably disposed as desired.

Figure 3:
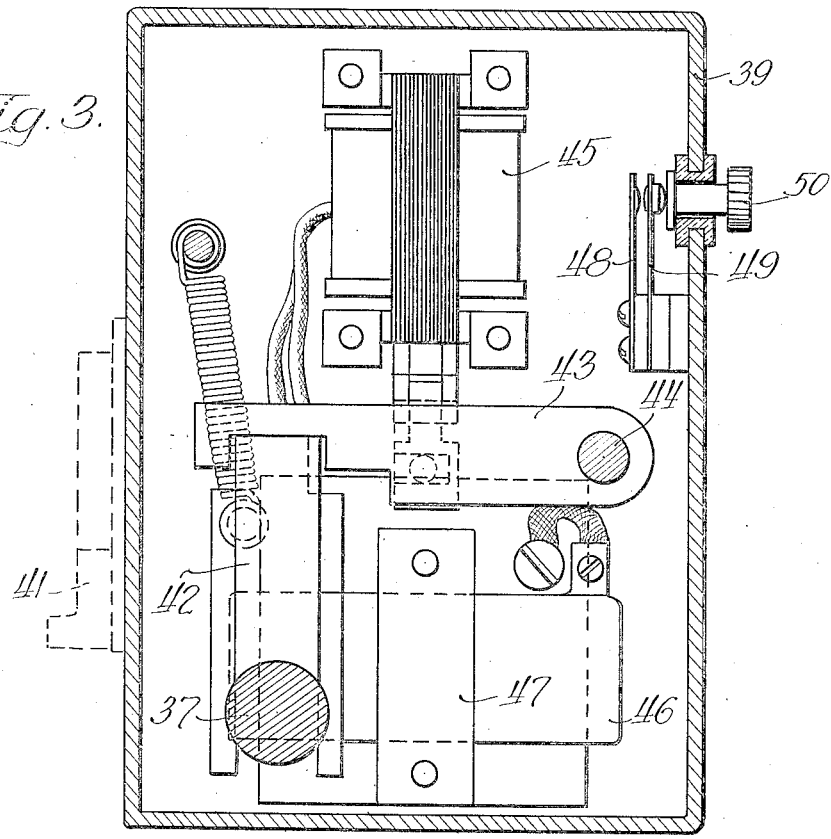
Figure 3 represents a view of my improved electrically governed interlock.
Figure 4:
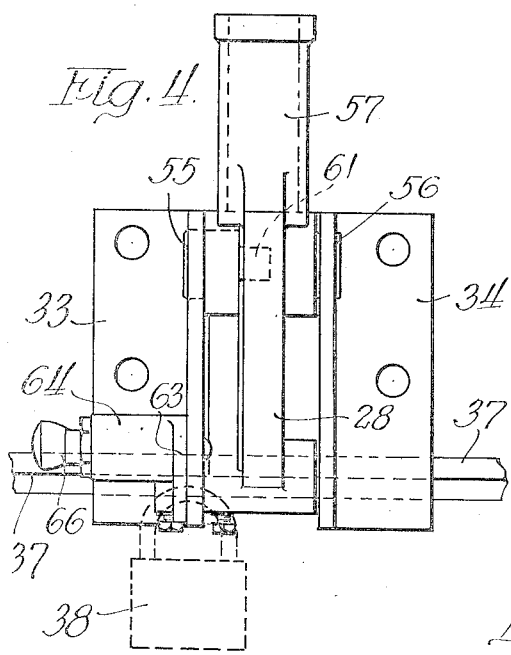
Figure 4 shows a front view of my novel mechanical interlock mechanism.

The interlock shaft 37 (which is now assumed to be released for operation due to the release of the interlock latch 43 discussed in connection with Figure 3) extends from the electrical interlock control assembly 39 (Figure 1) to the interlock mechanisms of the switches belonging to the set, and is adapted to cooperate with each of the mechanical interlocks, such as the one shown in Figures 4 to 8, inclusive.

Each of the interlock mechanisms comprises suitable mounting brackets such as 33—34. An actuating member 28 having an internal cam 62 is movably mounted between these brackets, being pivoted or journalled at the points 55—56. The member 28 is provided with an extension 57 to which may be attached a suitable handle, such as the handle 30 shown in Figure 2. Adjustably secured on the body of member 28 is a joint 58 for receiving the corresponding lever, such as 26 (Figure 2) which in turn, is secured to the adjustable joint, such as 25, carrying the corresponding switch-blade-actuating arm 24 also shown in Figure 2. The joint 58 is adjustable on the cam body 28 in order to allow for mounting and assembly variations. It will be apparent now that it is possible to move the switch blades, which are individual to this assembly, by moving the lever secured to the extension such as 57 and thereby rotating the body of the actuating member 28 around its pivots or within its bearings 55 and 56. However, such an operation is only possible if the interlock of the corresponding actuating member is released. This interlock co-operates with and is depending on the interlock shaft 37. This will be particularly described with reference to Figures 6 to 8.

Secured to the interlocking shaft 37 is a lever 60. This lever is disposed within the brackets 33 and 34 and carries a pin or projection 61 which engages a recess in the internal cam 62 provided in the actuating member or cam body 28. Assuming that the interlock shaft 37 is in normal position, and further assuming that all of the switch mechanisms are in the "connect" position (Figures 2, 4, and 6), the interlock pin 61 will engage the recess 74 in the cam portion 62 as is particularly shown in Figure 6. It will be clear from an examination of this figure, remembering that the conditions in case of all the switches of the unit are assumed to be alike, that it will be impossible to actuate any of the switches unless the corresponding locking pin 61 is removed from the recess 74 in the cam portion 62 of the actuating member which is to be operated. It will be understood, of course, that each of the interlock mechanisms belonging to the set of switches is provided with a locking lever such as 60 and a locking pin such as 61 engaging the corresponding interlock cam as is shown in Figure 6.

Figure 5:
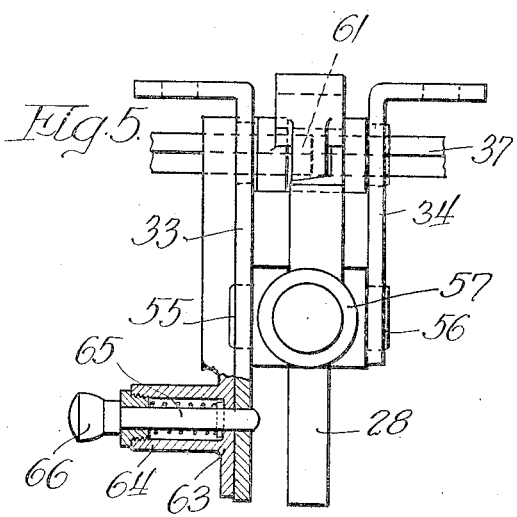
Figure 5 is a top view of the mechanism shown in Figure 4 with certain parts in cross section in order to indicate details.

Secured to the interlock shaft 37 is also a release lever such as 63. This release lever is provided with a handle portion 64 in which is disposed a spring locking pin 65 having an actuating knob 66, as shown in Figure 5. The pin 65 is adapted to engage recesses in the mounting bracket 33 provided for securing the lever 63 in any operating position. The release lever 63 is also provided with an extension 67 having an opening 68 (Figures 6–8) adapted to register with an opening 69 in the bracket 33. In the normal position of the interlock mechanism, as shown in Figure 6, the opening 68 of the interlock release lever 63 will register with the opening 69 in the bracket 33. The spring locking pin 65 will engage the recess 72 in the bracket 33 and thus afford additional security for the positioning of the release lever 63. The padlock 38 may be inserted through the openings 68 and 69 of the interlock release lever 63 and of the bracket 33, respectively, and may be locked in position in order to prevent unauthorized tampering with the apparatus as I have already intimated previously. The mechanism is particularly shown in this locked position in Figures 4 and 6. An operation of any of the switches is now impossible since they are locked by the padlocked levers 60 and pins 61 on the shaft 37, while the latter is locked within the control assembly 39.

However, assuming the condition previously stated, namely, that the circuit breaker has opened and that the attendant has depressed the member 50 on the control assembly 39, it will be remembered that the electrical interlock governing the actuation of the interlock shaft 37 has been released. Accordingly, the shaft 37 can now be actuated to release the interlock of the individual switch mechanisms. The padlock 38 is removed for this purpose. It is now possible to actuate the interlock release lever 63 after pulling the knob 66 to release the locking pin 65 from engagement with the corresponding locking recess 72 in the bracket 33. This is accomplished by lifting the lever 63 by means of the handle portion 64 into the position shown particularly in Figure 7. The shaft 37 will be rotated and will move all the locking levers such as 60 to remove the pins 61 from the corresponding recesses in the internal cams such as 62. Any of the interlocking cam bodies, such as 28, belonging to the set of switches can then be rotated into the position shown in Figure 7. The interlock pin 61 for the cam which is being rotated will travel along the first half or portion of the internal cam 62. The actuating member which is being rotated in this manner by 90°, actuates the corresponding switch and interrupts the previously maintained circuit connection. Any phase in the system can thus be disconnected individually.

It will also be apparent from the above, particularly after examining Figure 7, that the shape of the cam will not permit any operation of any cam beyond the position shown in Figure 7, since the corresponding locking pin 61 will engage the cam shoulder 75 as shown in this figure, thereby stopping further motion.

It should also be observed at this point that the spring locking pin 65 engages a second recess in the bracket 33 which is designated in Figure 6 by the numeral 70. The interlock release lever 63 is therefore locked in the position shown in Figure 7. The padlock may be inserted into and temporarily supported by any one of the openings in the bracket 33 now available, as is shown in Figure 7, for example, one of the openings 69, 72 or 73.

When the attendant has completed the disconnection of a phase as above explained, the interlock release lever 63 can again be restored to normal position shown in Figure 6. It will be recalled that the spring means shown in Figure 1, at numeral 40, exerts a tendency to move the interlock shaft 37 into the normal position. It is for this reason desirable to have some means for locking the interlock release lever in operated position as shown in Figure 7, which means is represented by the spring operated pin 65 provided on the release lever 63 as shown in Figure 5. The spring restoring means 40 (Figure 1) can, of course, be disposed at any suitable point on the unit. I have shown the same to be positioned next to the electrical interlock box 39 merely for the sake of convenience of description.

When the release lever 63 is restored to normal position as shown in Figure 6, after the corresponding interlocking cam has been moved by 90° into the position shown in Figure 7, the locking pin 61 will assume the position shown in this figure, that is, it will place itself midway in the central angular part of the cam 62 between the shoulders 75 and 76, thus locking this cam against any movement. The other interlocking cam bodies of the remaining switches are now assumed to be in the position shown in Figure 6, and accordingly, they are also locked against any movement due to the fact that the corresponding locking pins such as 61 engage the corresponding cam recess as is shown in Figure 6.

Let us now assume that all of the interlocking cams of all of the switches have been operated into the position which is shown in Figure 7, i. e., that all switches have been moved to disconnect position. It will be possible at this time to actuate all of the switches from the disconnect position to the grounded position. In other words this novel mechanical interlock permits selective and individual connection or disconnection of a single phase, but prevents grounding of any phase as long as any other phase is connected to the line. If all of the phases are disconnected, the interlock cams of all actuating members belonging to the set of switches will be in the position shown in Figure 7. The actuating members such as 28 can then be rotated further, e. g., into the position shown in Figure 8. The interlocking pins such as 61 will be able to pass along the second portion of the cams 62, indicated by numeral 77. Upon completion of the grounding operation, all of the interlocking mechanisms will be in the position shown in Figure 8 with the interlocking levers 60 and their interlocking pins 61 engaging the recesses in the corresponding cams as shown.

Changes may be devised in order to meet certain given conditions. I want to have it clearly understood that I have shown a specific embodiment only for the purpose of teaching others to realize the benefits of my invention and, therefore, I do not want to be limited to the precise construction shown and described. Neither do I wish to be limited to the use and application of my invention to any particular form or class of switches. My invention is manifestly adapted to be of service wherever it is desired to control a plurality of switches selectively and individually but to control the switches so that the individual operation is performed within two distinct and separate steps or cycles. I intend to use my invention subject only to the scope and limits of the appended claims, in which I have defined what I consider new and distinguishing in the art.

What I claim as new and desire to cover by Letters Patent is:

1. In combination with a plurality of like switches each adapted to be operated to a like plurality of distinct switching positions, interlocking means for said switches, means in said interlocking means for operating any of said switches selectively to a predetermined switching position and blocking the operation thereof to any other position, and means effective in said interlocking means after actuating all of said switches to said predetermined position for then operating said switches to another switching position.

2. In combination with a plurality of like switches each adapted to connect a conductor to a plurality of like contacts, actuating means for each switch, interlocking means cooperating with said actuating means for controlling the operation of any of said switches relative to a predetermined one of said contacts and blocking the operation thereof relative to other contacts, and means effective in said interlocking means upon positioning all of said switches relative to said predetermined contacts for controlling the operation of said switches relative to said other contacts.

3. In combination with a plurality of switches each adapted to connect a conductor to a plurality of contacts, actuating means for each switch, interlocking means cooperating with said actuating means for controlling the operation of any of said switches relative to a predetermined one of said contacts and blocking the operation thereof relative to other contacts, and means effective in said interlocking means upon positioning all of said switches relative to said predetermined contacts for controlling the operation of said switches relative to said other contacts, said interlocking means including cam means individual to each of said actuating means.

4. In combination with a plurality of switches each adapted to connect a conductor to a plurality of contacts, actuating means for each switch, interlocking means cooperating with said actuating means for controlling the operation of any of said switches relative to a predetermined one of said contacts and blocking the operation thereof relative to other contacts, and means effective in said interlocking means upon positioning all of said switches relative to said predetermined contacts for controlling the operation of said switches relative to said other contacts, said interlocking means including cam means individual to each of said actuating means and interlocking control means common to all of said actuating means.

5. In combination with a plurality of switches each adapted to connect a conductor to a plurality of contacts, interlocking means common to all of said switches for blocking the operation thereof, electrically controlled means for releasing said common interlocking means, individual interlocking means for each of said switches cooperating with said common interlocking means, means effective in said interlocking means for operating any of said switches selectively relative to predetermined contacts and blocking the operation thereof relative to other contacts, and means effective in said interlocking means upon positioning all of said switches relative to said predetermined contacts for then actuating said switches relative to said other contacts.

6. In a polyphase power transmitting system, a plurality of switches each adapted to connect a phase to a line or to ground, interlocking means for said switches, means effective in said interlocking means for selectively operating any of said switches relative to its corresponding phase and line and blocking the operation thereof relative to ground, and means effective in said interlocking means only upon disconnecting all of said phases from the line for operating said switches to grounding position.

7. In a polyphase power transmitting system, a plurality of switches each adapted to connect a phase to a line or to ground, interlocking means for said switches, means effective in said interlocking means for selectively operating any of said switches relative to its corresponding phase and line and blocking the operation thereof relative to ground, and means effective in said interlocking means only upon disconnecting all of said phases from the line for operating said switches to grounding position, said interlocking means including cam means individual to said switches.

8. In a polyphase power transmitting system, a plurality of switches each adapted to connect a phase to a line or to ground, interlocking means for said switches, means effective in said interlocking means for selectively operating any of said switches relative to its corresponding phase and line and blocking the operation thereof relative to ground, and means effective in said interlocking means only upon disconnecting all of said phases from the line for operating said switches to grounding positions, said interlocking means including cam means individual to said switches and interlocking control means common to all of said cam means and cooperating therewith.

9. In a system of the class described, a set of switches, each switch comprising an actuating member, a cam thereon, movable interlocking means for engagement with each cam, a single interlock control means for moving said interlocking means relative to said cams to operate said switches, and electrically controlled means for locking said control means against motion to block said switches.

10. A switching system for power transmitting polyphase equipment with single phase operation, wherein each of a plurality of switches is adapted to connect a phase to a line or to ground, the combination of mechanical interlocking means comprising, control means individual to each of said switches for governing the operation thereof, control means common to all of said switches for locking all of said switches against operation, and means on said common control means for interlocking engagement with said individual control means, whereby the grounding of any phase is blocked if another phase is connected to the line.

11. A switching system for power transmitting polyphase equipment with single phase operation, wherein each of a plurality of switches is adapted to connect a phase to a line or to ground, the combination of mechanical interlocking means comprising, control means individual to each of said switches for governing the operation thereof, control means common to all of said switches for locking all of said switches against operation, and means on said common control means for interlocking engagement with said individual control means, whereby the grounding of any phase is blocked if another phase is connected to the line, said individual control means comprising cam means for each switch, and said common control means comprising movable locking means for each cam.

12. A switching system for power transmitting polyphase equipment with single phase operation, wherein each of a plurality of switches is adapted to connect a phase to a line or to ground, the combination of mechanical interlocking means with said switches whereby the grounding of any phase is blocked if another phase is connected to the line, comprising cam means for each switch, movable locking means for each cam, a common control means for said locking means, and electrically actuated means for governing said common control means.

13. Switching apparatus for power transmitting polyphase equipment with single phase operation, wherein each of a plurality of switches is adapted to connect a phase to a line or to ground, the combination of mechanical interlocking means with said switches whereby the grounding of any phase is blocked if another phase is connected to the line, comprising individual cam means for each switch, movable locking means for each cam, a common control means for said locking means, and electrically actuated means for governing said common control means.

14. In a power transmitting system of the class described wherein each of a plurality of switches is adapted to connect a phase to a line or to ground the same, switching apparatus comprising, switches, an electrically governed interlock means arranged to inhibit the operation of said switches, contacts and operating means for energizing said interlock to release said switches for operation, and mechanically controlled interlocking means cooperating with said released interlock whereby said switches may be selectively operated only with respect to said phase and line, and whereby said grounding operation can be effected only after disconnection of all phases from said line.

15. A control means for an interlocking device of the class described comprising, a rotatably mounted member, and a plurality of arcuate cam paths in said member, said paths being continuous but of different radius from the mounting point of said member.

16. In an interlocking device for switches, a rotatable actuating member, a plurality of arcuate cam paths on said member, said paths being continuous but of different radius from the journal point of said member, switch operating means adjustably connected to said member, an interlocking member for engagement with said arcuate paths, and means for controlling said interlocking member.

17. A device for controlling a plurality of switches wherein each switch is adapted to be selectively operated in two distinct steps from normal to intermediate position and then to terminal position but wherein the operation from intermediate to terminal position is dependent on the positioning of all switches to intermediate position, said device comprising a rotatable actuating member for each switch, two arcuate paths of different radius on each actuating member, interlocking means for engagement with said arcuate paths of all actuating members, said interlocking means being adapted to cooperate with the arcuate path of larger radius during the operation of any switch from normal to intermediate position and to cooperate with the arcuate path of smaller radius during the operation of any switch from intermediate to terminal position, and a single means for governing said interlocking means.

18. In combination, a plurality of switches each arranged for operation within two distinct switching positions, control means for locking all of said switches against operation, and interlocking means cooperating with said control means whereby upon release of said control means any of said switches may be initially actuated selectively only within one of said switching positions and whereby said switches may be subsequently actuated within said second switching position only after all of said switches have been operated within said first position.

19. In combination, a plurality of switches each arranged for operation within two distinct switching positions, control means for locking all of said switches against operation, and interlocking means cooperating with said control means whereby upon release of said control means any of said switches may be initially actuated selectively only within one of said switching positions and whereby said switches may be subsequently actuated within said second switching position only after all of said switches have been operated within said first position, said interlocking means comprising a rotatably mounted cam member engaged by said control means.

20. In combination, a plurality of switches each arranged for operation within two distinct switching positions, control means for locking all of said switches against operation, and interlocking means cooperating with said control means whereby upon release of said control means any of said switches may be initially actuated selectively only within one of said switching positions and whereby said switches may be subsequently actuated within said second switching position only after all of said switches have been operated within said first position, said interlocking means comprising a plurality of movable cam members, one for each switch, and means for movably connecting each cam member with said control means.

FRANCIS D. WYATT.